G. W. SLOCOMB.
PUMP.
APPLICATION FILED SEPT. 9, 1919.

1,391,799.                                    Patented Sept. 27, 1921.
2 SHEETS—SHEET 1.

Witness:
W. M. Gentle

Inventor.
George W. Slocomb.
James R. Townsend
his atty.

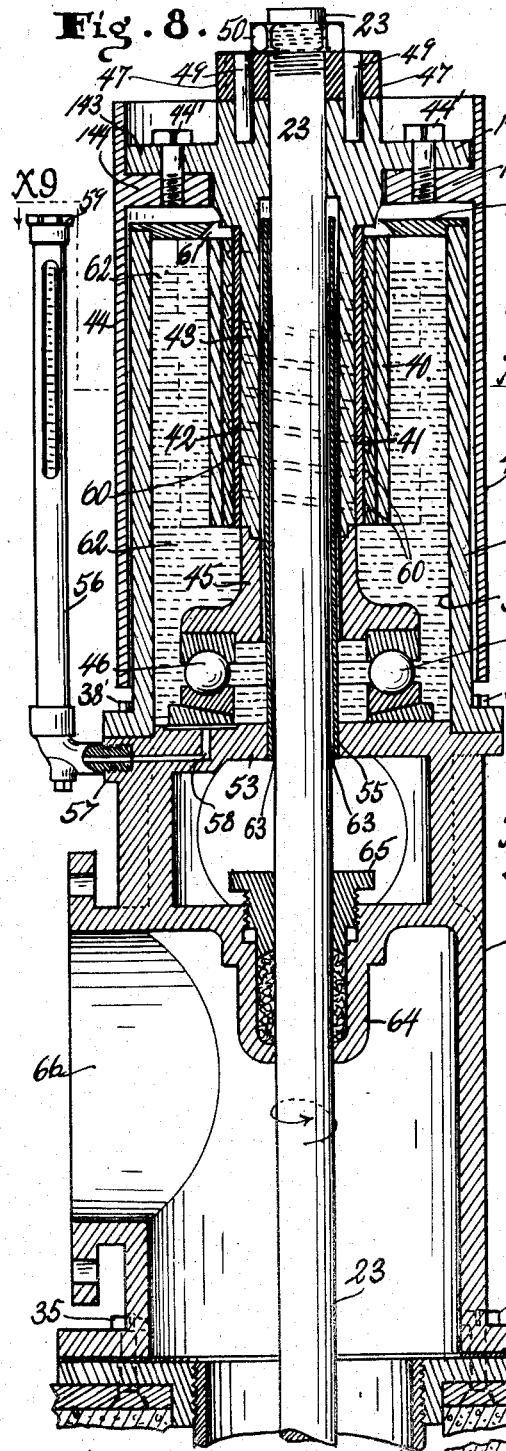
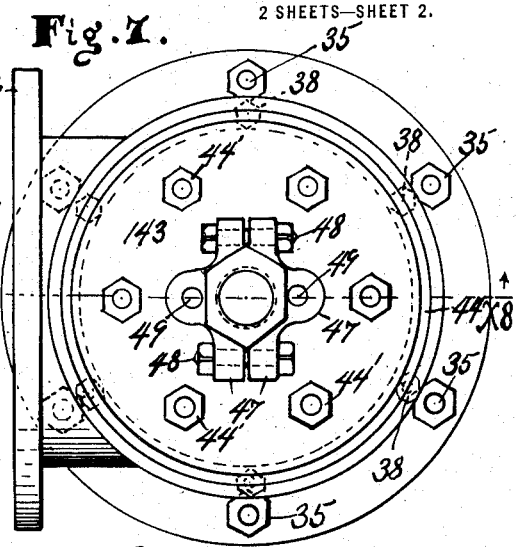
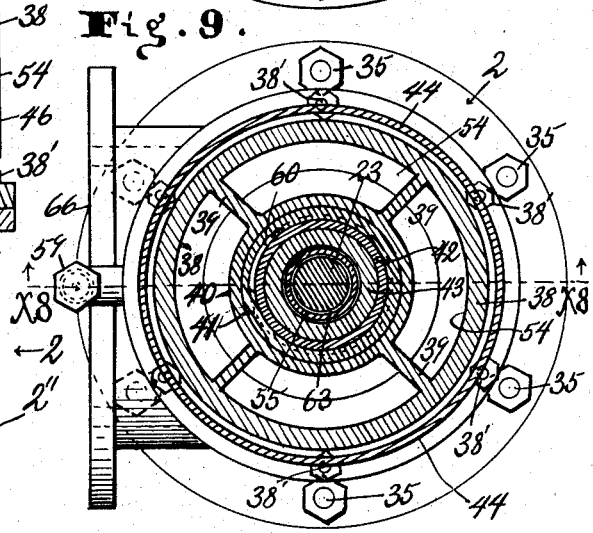
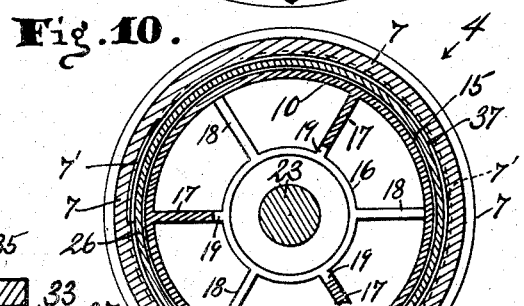

UNITED STATES PATENT OFFICE.

GEORGE W. SLOCOMB, OF LOS ANGELES, CALIFORNIA.

PUMP.

1,391,799.  Specification of Letters Patent.  Patented Sept. 27, 1921.

Application filed September 9, 1919. Serial No. 324,231.

*To all whom it may concern:*

Be it known that I, GEORGE W. SLOCOMB, a citizen of the United States, residing at Los Angeles, in the county of Los Angeles and State of California, have invented new and useful Improvements in Pumps, of which the following is a specification.

This invention relates to that class of pumps having a plurality of spaced water elevating or displacing units comprising concentric helical blades that are arranged on a shaft and operated inside of tubing; and this invention may be said to consist in novel features, and in the novel construction, combination and arrangement of parts as will appear hereinafter.

Pumps of this character are usually driven at a somewhat high speed, ranging from, say six hundred to fifteen hundred revolutions per minute, and a difficulty encountered in the operation of such pumps arises from the tendency to lateral vibration of the shaft and consequent wear and damage of parts and requirement of greater power. This is accentuated when rotating parts are moved by such vibration into frictional contact with other parts. An object of this invention is to provide superior means for holding the shaft and propeller blades steady during rotation.

This holding of shaft and parts attached thereto, against vibration, is accomplished by the water itself. In other words coaxial relation during rotation between the rotating and stationary parts, without direct contact of the parts, is established and maintained automatically.

This automatic feature has many advantages. It does away with the necessity of bearings on the shaft; and consequently the need of oil and grease for the same is eliminated. It reduces wear and damage, and consequently, repairs, to a minimum, and will enable the pump to run for long periods of time without care or supervision.

A feature of this invention is shown in the simplicity, lightness and cheapness of of construction, ease of assembly and durability of the parts comprising the water displacing units.

An object is to make provision for eliminating any sediment that otherwise might accumulate in the compartments of the water elevating or displacing units, and to prevent loss by water slippage between the outer periphery of the propelling, rotary element and the outer tubing. This loss by slippage is common to all other rotating helical blade pumps and ranges twenty per cent. and more.

A further object of my invention is to construct and arrange parts so that, as the liquid reaches the propelling, rotary element, an equilibrium of centrifugal action of the liquid within the rotary element is established as nearly as possible in order to relieve the rotary element of undue strain and thus to maximize the efficiency of the pump operation.

Other objects, advantages, and features of invention may appear from the accompanying drawings, the subjoined detailed description and the appended claims.

The accompanying drawings illustrate the invention.

Fig. 7 is an enlarged plan of the pump head shown in Fig. 1.

Fig. 8 is an enlarged fragmental axial section on line $x^8$, Figs. 1, 7 and 9.

Fig. 9 is a transverse section on line $x^9$, Fig. 8.

Fig. 10 is a fragmental transverse section on line $x^{10}$, Fig. 3.

Figure 1:
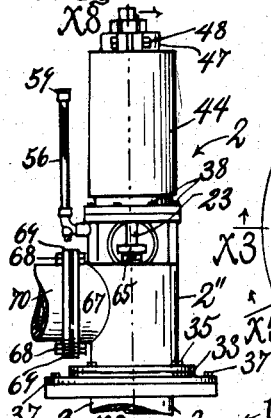
Figure 1 is a fragmental elevation partly in section of a pump constructed in accordance with this invention.
Figure 2:
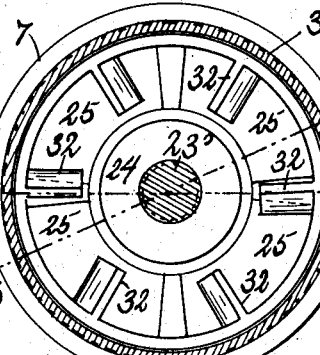
Fig. 2 is an enlarged transverse section on line $x^2$, Fig. 1.

The pump 1 comprises a pump head 2, and tubing which is connected at one end to the pump head, and consists of sections or lengths 3, and water displacing units 4 interposed between said sections.

The bottom end of the tubing is provided with the usual water inlets 5 preferably covered with a screen 6 to prevent coarse solids from passing into the interior of the tubing.

The casings 7 of the water displacing units 4 are pipe couplings that are threaded at their ends for connection to the tubing sections 3; and are provided in the interior wall with helical channel 7', to discharge sediment from the stabilizing compartments of the water displacing units and also to help maintain full efficiency.

The units 4 are substantially alike. In each of the couplings 7 there is inserted a cylindrical guide 10 which has its lower end provided with a threaded flange extension 11 that is adapted to fit the internal threads of the lower end of the coupling 7, and that has a shoulder 12 which is screwed tightly against a shoulder 13 formed in the coupling 7. This inserted cylindrical tube extends upward about three-quarters of the distance of the channeled space between the threaded ends. A cylindrical chamber 14 is thereby formed between the channeled wall of the coupling 7 and the exterior of the guide 10. The exterior diameter of the guide 10 from the shoulder 12 nearly to the top, is somewhat reduced to form an enlarged annular recess 15.

Figures 3, 5:
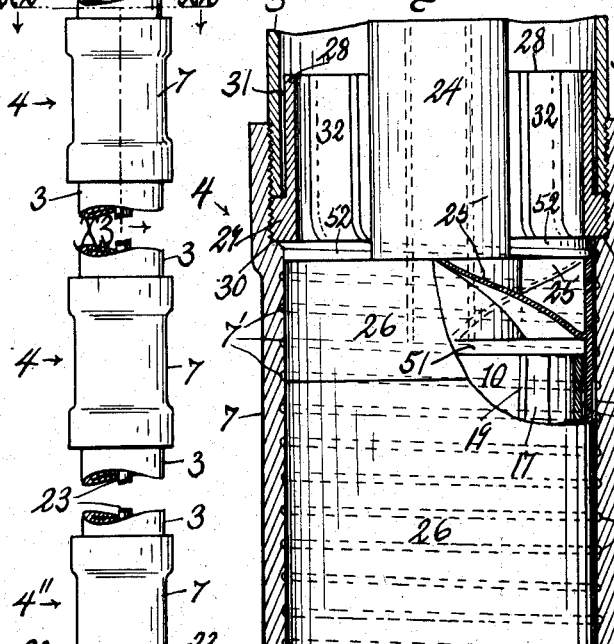
Fig. 3 is an enlarged sectional elevation on line $x^3$, Fig. 2.
Fig. 5 is a fragmental elevation partly in section on line $x^5$, Fig. 2.
Figure 4:
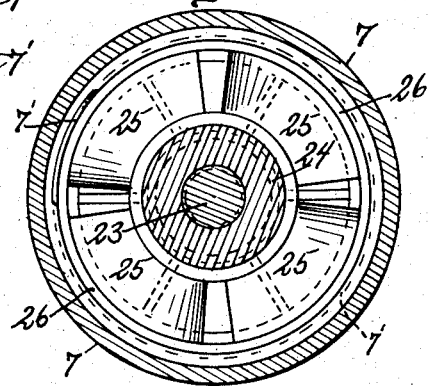
Fig. 4 is a transverse section on line $x^4$, Fig. 3.
Figure 6:
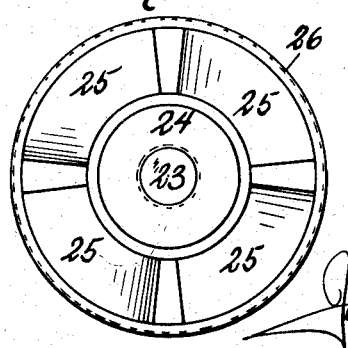
Fig. 6 is a plan of the rotary hub and associated parts.

The guide 10 is provided internally with a grid or spider comprising an inner ring 16 and radial guide wings 17, 18, which wings are arranged alternately, the wings 17 being preferably extended upward to the top of the cylindrical guide 10 and having upwardly diverging, inner edges 19, as shown in Figs. 3 and 5, and the wings 18 being extended only to the top of ring 16.

In ring 16' of the bottom unit 4'', there is firmly inserted a plug 20 that has a slot 21 in the top into which slot the flattened extension 22 on the bottom end of the shaft 23 is adapted to fit to hold the shaft from turning while the associated parts of the shaft and tube sections are being assembled and secured in place; after which the shaft is raised by means that will be explained later, to lift the extension 22 clear of the slot 21.

The shaft 23 is fastened to hubs 24 that are contained within the units 4. In the form shown the shaft is made in section and ends 23' and 23'' of the shaft sections are provided with left hand threads that are adapted to fit into threaded hub 24. That is, the threaded end 23' of one part of the shaft is secured in the lower end of a hub and the end 23'' of another part of the shaft is fitted in the top of the same hub and these shaft ends abut end to end within the hub 24.

At the bottom of the hub 24 and integrally connected thereto, are helical segments 25 which are the water displacing blades of the units 4. These blades 25 are inclined from their lower front edges upwardly at a pitch that is adapted to displace the water most effectively and their outer edges are integrally connected to a cylindrical sleeve 26 which extends downward into the annular chamber 14 between the inner wall of the coupling 7 and the exterior wall of the guide 10.

The sleeve 26 has about two-thirds of its outer wall at the lower portion thereof, slightly reduced in thickness to form a larger space 27 between the outer surface of the sleeve and the inner wall of the coupling 7, and this enlarged space 27 corresponds to the clearance 15 between the outer wall of the guide 10 and inner wall of the sleeve 26. The purpose of the clearance 15 and space 27 is to provide room for columns of water in the form of cylindrical sheets or films between the surfaces of the cylindrical sleeve 26 and the walls of the chamber 14, in which clearance the cylindrical sleeve 26 is practically floating during operation. During such operation the water in the two clearance spaces 15 and 27 will be caused by rotation of the sleeve 26 to rotate very rapidly; the water in the inner space 15 rotating more rapidly than that in the outer space 27. The centrifugal force of such rotation in the annular recess 15 will cause the water therein to form an impervious concentric wall around the outer surface of guide 10, and space 15 will be continually spilling whirling water past the bottom of sleeve 26 into space 27 where it will continue its rotation, the helical channels 7' assisting it to whirl upward. All solids whirling with the water, being heavier than the water, will take and follow the helical channels 7'' and discharge at the top. The effect of the rotating water in the two annular spaces 15 and 27 is the same in kind; the only difference being in degree. Acting together, the effect is exactly what is desired:—viz. the stabilizing of the rotating parts without lateral motion or vibration, and without permitting any direct contact between the rotating and non-rotating parts. In each unit 4 the water automatically performs the work of a bearing on the shaft. The units should not be spaced farther apart than would be necessary for bearings. As this distance is short, the water pressure at the top of each unit 4 is light, so that the automatic stabilizing action explained above in conjunction with the helical channels prevents loss by back pressure of water between the outer surface of sleeve 26 and the inner surface of coupling 7, so that there is no loss by slippage.

A cylindrical deflector 28 having at its lower end a threaded flange 29 that is adapted to fit a portion of the threaded upper end of the coupling 7 is screwed down into the end of the coupling until it contacts with the shoulder 30 in the coupling. The flange 29 is of sufficient width to leave a clearance 31 between the deflector 28 and the coupling 7 to allow the tubing 3 to be screwed into the end of the coupling and down against the flange 29.

Within the cylindrical wall of the deflector 28 and integral therewith are the radial deflector wings 32 that have their lower ends curved sidewise, with the bottom of curve pointing against direction of rotation, and these curved ends are adapted to receive the water from the helical blades 25 and guide it upward when the pump is in action.

As seen in Figs. 1 and 8 the top end of the tubing 3 is threaded and attached to an inverted thimble 33 that is secured between the plate 34 and the base 2″ of the pump head by the bolts 35; and the plate 34 can be secured to a cement foundation 36. The attachment of the head to the foundation is old and well known and further description thereof is unnecessary.

To the top of the pump head base there is secured by bolts 38′ a bearing casing 38 which has inwardly extending radial wings 39 that are integrally connected to the inner bearing cylinder 40.

Within cylinder 40 there is secured a bushing 41 that may be of Babbitt metal or other suitable material and that contacts with steel band 42 shrunk on the hub 43 of the pulley 44.

The hub 43 has its lower end supported by a stand 45 on a ball bearing 46 which bearing supports the shaft 23, and through its connections the driving pulley 44. The hub 43 is connected to the pulley 44 by rigid means, and for this purpose the hub 43 is provided at the top with an external flange 143 and the pulley 44 has an internal flange 144 fixed to the flange 143 by bolts 44′. The hub 43 is fixed to the shaft by a connection formed of a split block 47 that is clamped to the shaft by clamp bolts 48 and pins 49 seated in the split block and the hub so that when power is applied to the pulley 44 it will be transmitted to the shaft by the connection above described.

A portion of the upper end of the shaft 23 is threaded for the thrust nut 50 which rests on the split block which may be loosened temporarily to allow the thrust nut to be screwed down to lift the shaft and its rotary connection a slight distance so as to clear the extension 22 on the lower end of the shaft from the slot 21, and to also form a clearance 51 between the top edges of the guide 10 and wings 17 and the bottom of the helical blades 25. Care is taken to leave a clearance space 52 between sleeve 26 and the bottom of the deflector 28.

The bearing casing 38 is secured to the top 53 of the pump head base 2″ so as to form an oil receptacle 54, and within this oil receptacle loosely surrounding the shaft 23 is a sleeve 55 that has one end secured to the top 53 of the pump head base. Said sleeve 55 forms an oil retaining wall in the chamber and a cylindrical opening through which the shaft can operate.

A gage 56 has one end attached to the threaded boss 57 of the pump head 2 and an opening through the gage is in communication through the port 58 with the oil receptacle 54. The gage extends upward and its upper end is provided with a cap 59 which is adapted to be unscrewed and removed when the chamber 54 is to be filled or replenished with oil.

In the inner wall of the bushing 41 there is a helical oil channel 60 that extends from the bottom of the bushing to openings 61 at the top of the bushing to allow oil to flow upward through the channel and to discharge through the opening 61 in oil chamber cover 54′ back into the body 62 of the oil when the pump is in operation.

A clearance is provided between the shaft 23 and the sleeve 55 so that there is no frictional contact between these parts.

The pump head is provided with the usual stuffing box 64 and plug nut 65, and also with a water outlet 66 which is provided with a pipe flange 67 that is adapted to be connected by bolts 68 to flange 69 of a pipe 70.

The pump head construction is mainly old and well known; the invention in this part of the device relating more particularly to simple, neat and compact arrangement of parts and the features directed toward durability.

Assuming that the parts are assembled as hereinafter described and the tubing and associated parts lowered into a well so that one or more of the units 4 are submerged in the water, then the pump is operated by applying power to the pulley to rotate the shaft 23 indicated by the curved direction arrows in Figs. 3 and 8. Such movement of the shaft will cause the helical blades in the successive units to displace or elevate the water, driving it upward through the tubing from unit to unit until it is discharged at the top of the pump through outlet 66.

During the operation, some water flows over the top of the cylindrical guides 10 and into the chambers 14 thereby establishing rotating film-like cylindrical water columns around all surfaces of the cylindrical sleeves 26. Said water columns support these sleeves and consequently the shaft 23 from side vibration without any rotating parts coming into direct contact with any of the stationary parts. The water thus passing into the chambers of the units 4 also establishes a water lubrication between the moving and stationary parts.

The successive steps in assembling the units are as follows: Let a unit in the middle be taken. Previously assembled units are hanging down in the well, supported by a clamp around tubing on the top of the well, the threaded tubing end 3 and shaft 23 projecting above. Screw guide 10 into one end of threaded coupling 7 until inner face of flange 11 abuts firmly against shoulder 13. Screw this end of coupling 7 over tubing 3 and screw down tight so that the threaded flange 11 of guide 10 is tightly held between ends of tubing 3 and shoulder 13. Next insert projecting sleeve of propeller 26 into slot 14 and screw lower end of hub 24 onto top end of shaft section 23 until the lower points of propeller blades 25 just lightly touch the top of guide vanes 17. The shaft during the assemblage is supported by plug 20 in ring 16 of bottom guide 10 in casing 4''. The flattened end 22 being inserted in slot 21 prevents rotation of shaft while assembling. The shaft sections are adjusted in length to take up half the length of hub 24, which it will be observed extends above the top of coupling 7 so that a wrench may be applied in screwing hub 24 to exact place. Next screw deflector 28 into top of coupling 7 until outer end of threaded flanged portion 29 rests against shoulder 30. Observe that top of 28 projects above top of coupling 7 and end of hub 24 is still above top of deflector 28. Screw end of another section of shaft 23 into top end of hub 24 until ends abut firmly, using wrench on projecting end of hub 24 as a "back up" in the process. Screw tubing 3 into end of coupling until threaded end of deflector 29 is fastened tightly between tubing end and shoulder 30. The unit is now finished and ready to be lowered for the assemblage of another unit. The thread of tubing is right hand and that of shaft is left hand so that in rotating in a left hand direction all thread joints remain firm.

I claim:—

1. In a pump the combination with a substantially vertical casing comprising lengths of tubing joined together by couplings, said couplings having threaded portions adapted to connect said lengths, and having shoulders at the inner end of said threaded portions, of a shaft rotatably mounted in the casing; a cylindrical guide in each coupling, said guide surrounding the shaft and being concentric therewith and firmly held between the end of a length of tubing and one of said shoulders and extending upwardly therefrom, radial wings in each of said guides; helical blades connected with the shaft above the guide in each coupling and provided with a downwardly extending sleeve surrounding the shaft and the guide and being concentric therewith, there being an annular recess between the inner periphery of the sleeve and the outer periphery of the guide and also an annular recess between the outer periphery of the sleeve and the inner periphery of the coupling so that liquid supplied by the action of the pump may fill said recesses and hold the sleeve in true axial rotation; a deflector secured above the helical blades in each coupling for preventing a whirling action of the liquid and for guiding it upwardly; said deflector having a threaded flanged end which is held between the end of a length of tubing and the other of said shoulders; a helical channel on the inner surface of each coupling, said helical channel leading in the direction of rotation in order that sediment may be expelled from the casing by the action of the liquid and in order that the efficiency of the pump may be maintained; and means for rotating the shaft.

2. In a pump, the combination with a substantially vertical casing comprising sections joined together by couplings, of a shaft rotatably mounted in the casing; a cylindrical guide in each coupling, said guide surrounding the shaft and being concentric therewith and extending upwardly from the lower end of the coupling; radial wings in each of said guides, said wings having upwardly diverging inner edges; helical blades connected with the shaft above the guide in each coupling and provided with a downwardly extending sleeve surrounding the shaft and the guide and being concentric therewith, there being an annular recess between the inner periphery of the sleeve and the outer periphery of the guide and also an annular recess between the outer periphery of the sleeve and the inner periphery of the coupling so that liquid supplied by the action of the pump may fill said recesses and hold the sleeve in true axial rotation; and means for rotating the shaft.

3. In a pump, the combination with a substantially vertical casing comprising sections joined together by couplings, of a shaft rotatably mounted in the casing; a cylindrical guide in each coupling, said guide surrounding the shaft and being concentric therewith and extending upwardly from the lower end of the coupling; radial wings in each of said guides, said wings having upwardly diverging inner edges; helical blades connected with the shaft above the guide in each coupling and provided with a downwardly extending sleeve surrounding the shaft and the guide and being concentric therewith, there being an annular recess between the inner periphery of the sleeve and the outer periphery of the guide and also an annular recess between the outer periphery of the sleeve and the inner periphery of the coupling so that liquid supplied by the action of the pump may fill said recesses and hold the sleeve in true axial rotation; a deflector secured above the helical blades in each coupling for preventing a whirling action of the liquid and for guiding it upwardly; and means for rotating the shaft.

4. In a pump, the combination with a substantially vertical casing comprising sections joined together by couplings, of a shaft rotatably mounted in the casing; a cylindrical guide in each coupling, said guide surrounding the shaft and being concentric therewith and extending upwardly from the lower end of the coupling; radial wings in each of said guides, said wings having upwardly diverging inner edges; helical blades connected with the shaft above the guide in each coupling and provided with a downwardly extending sleeve surrounding the shaft and the guide and being concentric therewith, there being an annular recess between the inner periphery of the sleeve and the outer periphery of the guide and also an annular recess between the outer periphery of the sleeve and the inner periphery of the coupling so that liquid supplied by the action of the pump may fill said recesses and hold the sleeve in true axial rotation; a helical channel on the inner surface of each coupling, said helical channel leading in the direction of rotation in order that sediment may be expelled from the casing by the action of the liquid and in order that the efficiency of the pump may be maintained; and means for rotating the shaft.

5. In a pump, the combination with a substantially vertical casing comprising sections joined together by couplings, of a shaft rotatably mounted in the casing; a cylindrical guide in each coupling, said guide surrounding the shaft and being concentric therewith and extending upwardly from the lower end of the coupling; radial wings in each of said guides, said wings having upwardly diverging inner edges; helical blades connected with the shaft above the guide in each coupling and provided with a downwardly extending sleeve surrounding the shaft and the guide and being concentric therewith, there being an annular recess between the inner periphery of the sleeve and the outer periphery of the guide and also an annular recess between the outer periphery of the sleeve and the inner periphery of the coupling so that liquid supplied by the action of the pump may fill said recesses and hold the sleeve in true axial rotation; a deflector secured above the helical blades in each coupling for preventing a whirling action of the liquid and for guiding it upwardly; a helical channel on the inner surface of each coupling, said helical channel leading in the direction of rotation in order that sediment may be expelled from the casing by the action of the liquid and in order that the efficiency of the pump may be maintained; and means for rotating the shaft.

6. In a pump comprising a casing and a shaft mounted to rotate therein substantially as set forth, means at the bottom to hold said shaft from turning while assembling the pump.

7. In a pump having lengths of tubing and a shaft; a coupling having threaded end portions adapted to connect the lengths of tubing and having shoulders at the inner ends of said threaded portions and a helical channel extending upwardly from shoulder to shoulder and in the direction of rotation, the inside diameter of said coupling throughout the space between said shoulders being approximately the same as the inside diameter of said tubing; helical blades connected to said shaft; a sleeve connected to and encircling said blades and extending downwardly therefrom; said sleeve being adapted to be fully inserted with clearance in the space between said shoulders; a deflector adapted to prevent whirling, and having a threaded flanged end secured to said coupling above said blades and held between one of said shoulders and the end of a length of tubing; and a cylindrical guide adapted to be inserted with proper clearance inside the downwardly extending portion of said sleeve, and wherein water supplied by the action of the pump to said clearance and the clearance between said sleeve and coupling, may operate to hold the sleeve in true axial relation; said cylindrical guide having a threaded flanged end held between the other of said shoulders and the end of a length of tubing.

In testimony whereof, I have hereunto set my hand at Los Angeles, California, this 4th day of September, 1919.

GEO. W. SLOCOMB.

Witness:

JAMES R. TOWNSEND.